US 8,561,144 B2

(12) United States Patent
Mahaffey et al.

(10) Patent No.: US 8,561,144 B2
(45) Date of Patent: *Oct. 15, 2013

(54) ENFORCING SECURITY BASED ON A SECURITY STATE ASSESSMENT OF A MOBILE DEVICE

(71) Applicant: Lookout, Inc., San Francisco, CA (US)

(72) Inventors: Kevin Patrick Mahaffey, San Francisco, CA (US); John G. Hering, San Francisco, CA (US); James David Burgess, San Francisco, CA (US)

(73) Assignee: Lookout, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/742,110

(22) Filed: Jan. 15, 2013

(65) Prior Publication Data

US 2013/0130649 A1    May 23, 2013

Related U.S. Application Data

(63) Continuation of application No. 13/314,032, filed on Dec. 7, 2011, now Pat. No. 8,365,252, which is a continuation of application No. 12/255,632, filed on Oct. 21, 2008, now Pat. No. 8,087,067.

(51) Int. Cl.
H04L 29/06 (2006.01)
G06F 11/00 (2006.01)
G06F 12/14 (2006.01)
G06F 12/16 (2006.01)
G08B 23/00 (2006.01)

(52) U.S. Cl.
USPC .............. 726/3; 726/23; 726/24; 726/25

(58) Field of Classification Search
None
See application file for complete search history.

(56) References Cited

U.S. PATENT DOCUMENTS

| 3,416,032 A | 12/1968 | Jahns et al. |
| 4,553,257 A | 11/1985 | Mori et al. |
| 5,319,776 A | 6/1994 | Hile et al. |
| 5,574,775 A | 11/1996 | Miller, II et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |

(Continued)

FOREIGN PATENT DOCUMENTS

| GB | 2430588 | 3/2007 |
| WO | 2007081356 | 7/2001 |

(Continued)

OTHER PUBLICATIONS

PCT International Preliminary Report on Patentability for PCT/US2011/049182; Mailed on Mar. 7, 2013; pp. 1-9.

(Continued)

Primary Examiner — Shin-Hon Chen
(74) Attorney, Agent, or Firm — Dergosits & Noah LLP

(57) ABSTRACT

Security data generated by an application running on a mobile communications device is stored in a database. The security data is processed to assess a current security state of the device. In response to a request from the device for access to a service provider or a request from a service provider to access the device, the current security state assessment can be provided for enforcement of a security policy.

17 Claims, 9 Drawing Sheets

(56) References Cited

U.S. PATENT DOCUMENTS

| | | | |
|---|---|---|---|
| 6,301,668 B1 | 10/2001 | Gleichauf et al. | |
| 6,453,345 B2 | 9/2002 | Trcka et al. | |
| 6,529,143 B2 | 3/2003 | Mikkola et al. | |
| 6,696,941 B2 | 2/2004 | Baker | |
| 6,792,543 B2 | 9/2004 | Pak et al. | |
| 6,892,225 B1 | 5/2005 | Tu et al. | |
| 6,907,530 B2 | 6/2005 | Wang | |
| 6,959,184 B1 * | 10/2005 | Byers et al. | 455/410 |
| 7,020,895 B2 | 3/2006 | Albrecht | |
| 7,023,383 B2 | 4/2006 | Stilp et al. | |
| 7,069,589 B2 | 6/2006 | Schmall et al. | |
| 7,096,368 B2 | 8/2006 | Kouznetsov et al. | |
| 7,123,933 B2 | 10/2006 | Poor et al. | |
| 7,127,455 B2 | 10/2006 | Carson et al. | |
| 7,159,237 B2 | 1/2007 | Schneier et al. | |
| 7,171,690 B2 | 1/2007 | Kouznetsov et al. | |
| 7,178,166 B1 | 2/2007 | Taylor et al. | |
| 7,181,252 B2 | 2/2007 | Komsi | |
| 7,210,168 B2 | 4/2007 | Hursey et al. | |
| 7,228,566 B2 | 6/2007 | Caceres et al. | |
| 7,236,598 B2 | 6/2007 | Sheymov et al. | |
| 7,237,264 B1 | 6/2007 | Graham et al. | |
| 7,266,810 B2 | 9/2007 | Karkare et al. | |
| 7,290,276 B2 | 10/2007 | Ogata | |
| 7,304,570 B2 | 12/2007 | Thomas et al. | |
| 7,305,245 B2 | 12/2007 | Alizadeh-Shabdiz | |
| 7,308,256 B2 | 12/2007 | Morota et al. | |
| 7,308,712 B2 | 12/2007 | Banzhof | |
| 7,325,249 B2 | 1/2008 | Sutton et al. | |
| 7,356,835 B2 | 4/2008 | Gancarcik et al. | |
| 7,376,969 B1 | 5/2008 | Njemanze et al. | |
| 7,386,297 B2 | 6/2008 | An | |
| 7,392,043 B2 | 6/2008 | Kouznetsov et al. | |
| 7,392,543 B2 | 6/2008 | Szor | |
| 7,397,424 B2 | 7/2008 | Houri | |
| 7,397,434 B2 | 7/2008 | Mun et al. | |
| 7,401,359 B2 | 7/2008 | Gartside et al. | |
| 7,403,762 B2 | 7/2008 | Morgan et al. | |
| 7,414,988 B2 | 8/2008 | Jones et al. | |
| 7,415,270 B2 | 8/2008 | Wilhelmsson et al. | |
| 7,433,694 B2 | 10/2008 | Morgan et al. | |
| 7,467,206 B2 | 12/2008 | Moore et al. | |
| 7,471,954 B2 | 12/2008 | Brachet et al. | |
| 7,472,422 B1 | 12/2008 | Agbabian | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz | |
| 7,525,541 B2 | 4/2009 | Chun et al. | |
| 7,551,579 B2 | 6/2009 | Alizadeh-Shabdiz | |
| 7,551,929 B2 | 6/2009 | Alizadeh-Shabdiz | |
| 7,634,800 B2 * | 12/2009 | Ide et al. | 726/3 |
| 7,685,132 B2 | 3/2010 | Hyman | |
| 7,696,923 B2 | 4/2010 | Houri | |
| 7,768,963 B2 | 8/2010 | Alizadeh-Shabdiz | |
| 7,769,396 B2 | 8/2010 | Alizadeh-Shabdiz et al. | |
| 7,774,637 B1 | 8/2010 | Beddoe et al. | |
| 7,783,281 B1 | 8/2010 | Cook et al. | |
| 7,809,353 B2 | 10/2010 | Brown et al. | |
| 7,809,366 B2 | 10/2010 | Rao et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,856,373 B2 | 12/2010 | Ullah | |
| 7,861,303 B2 | 12/2010 | Kouznetsov et al. | |
| 7,907,966 B1 | 3/2011 | Mammen | |
| 7,916,661 B2 | 3/2011 | Alizadeh-Shabdiz et al. | |
| 7,991,854 B2 | 8/2011 | Bahl | |
| 7,999,742 B2 | 8/2011 | Alizadeh-Shabdiz et al. | |
| 8,014,788 B2 | 9/2011 | Alizadeh-Shabdiz et al. | |
| 8,019,357 B2 | 9/2011 | Alizadeh-Shabdiz et al. | |
| 8,031,657 B2 | 10/2011 | Jones et al. | |
| 8,054,219 B2 | 11/2011 | Alizadeh-Shabdiz | |
| 8,087,082 B2 | 12/2011 | Bloch et al. | |
| 8,089,398 B2 | 1/2012 | Alizadeh-Shabdiz | |
| 8,089,399 B2 | 1/2012 | Alizadeh-Shabdiz | |
| 8,090,386 B2 | 1/2012 | Alizadeh-Shabdiz | |
| 8,108,555 B2 | 1/2012 | Awadallah et al. | |
| 8,121,617 B1 | 2/2012 | LaGrotta et al. | |
| 8,126,456 B2 | 2/2012 | Lotter et al. | |
| 8,127,358 B1 | 2/2012 | Lee | |
| 8,135,395 B2 | 3/2012 | Cassett et al. | |
| 8,195,196 B2 | 6/2012 | Haran et al. | |
| 8,259,568 B2 | 9/2012 | Laudermilch et al. | |
| 8,261,351 B1 | 9/2012 | Thornewell et al. | |
| 8,266,288 B2 | 9/2012 | Banerjee et al. | |
| 8,266,324 B2 | 9/2012 | Baratakke et al. | |
| 8,346,860 B2 | 1/2013 | Berg et al. | |
| 8,356,080 B2 | 1/2013 | Luna et al. | |
| 8,364,785 B2 | 1/2013 | Plamondon | |
| 2001/0044339 A1 | 11/2001 | Cordero et al. | |
| 2002/0042886 A1 | 4/2002 | Lahti et al. | |
| 2002/0087483 A1 | 7/2002 | Harif | |
| 2002/0108058 A1 | 8/2002 | Iwamura | |
| 2002/0183060 A1 | 12/2002 | Ko et al. | |
| 2002/0191018 A1 | 12/2002 | Broussard | |
| 2003/0028803 A1 | 2/2003 | Bunker et al. | |
| 2003/0046134 A1 | 3/2003 | Frolick et al. | |
| 2003/0079145 A1 | 4/2003 | Kouznetsov et al. | |
| 2003/0115485 A1 | 6/2003 | Milliken et al. | |
| 2003/0120951 A1 | 6/2003 | Gartside et al. | |
| 2003/0131148 A1 | 7/2003 | Kelley et al. | |
| 2004/0022258 A1 | 2/2004 | Tsukada et al. | |
| 2004/0025042 A1 | 2/2004 | Kouznetsov et al. | |
| 2004/0133624 A1 | 7/2004 | Park | |
| 2004/0158741 A1 | 8/2004 | Schneider | |
| 2004/0185900 A1 | 9/2004 | McElveen | |
| 2004/0209608 A1 | 10/2004 | Kouznetsov et al. | |
| 2004/0225887 A1 | 11/2004 | O'Neil et al. | |
| 2004/0259532 A1 | 12/2004 | Isomaki et al. | |
| 2005/0010821 A1 | 1/2005 | Cooper et al. | |
| 2005/0015443 A1 | 1/2005 | Levine et al. | |
| 2005/0074106 A1 | 4/2005 | Orlamunder et al. | |
| 2005/0076246 A1 | 4/2005 | Singhal | |
| 2005/0091308 A1 | 4/2005 | Bookman et al. | |
| 2005/0125779 A1 | 6/2005 | Kelley et al. | |
| 2005/0130627 A1 | 6/2005 | Calmels et al. | |
| 2005/0138395 A1 | 6/2005 | Benco et al. | |
| 2005/0138413 A1 | 6/2005 | Lippmann et al. | |
| 2005/0138450 A1 | 6/2005 | Hsieh | |
| 2005/0154796 A1 | 7/2005 | Forsyth | |
| 2005/0186954 A1 | 8/2005 | Kenney | |
| 2005/0197099 A1 | 9/2005 | Nehushtan | |
| 2005/0221800 A1 | 10/2005 | Jackson et al. | |
| 2005/0227669 A1 | 10/2005 | Haparnas | |
| 2005/0237970 A1 | 10/2005 | Inoue | |
| 2005/0240999 A1 | 10/2005 | Rubin et al. | |
| 2005/0254654 A1 | 11/2005 | Rockwell et al. | |
| 2005/0278777 A1 * | 12/2005 | Loza | 726/4 |
| 2005/0282533 A1 | 12/2005 | Draluk et al. | |
| 2006/0026283 A1 | 2/2006 | Trueba | |
| 2006/0073820 A1 | 4/2006 | Craswell et al. | |
| 2006/0075388 A1 | 4/2006 | Kelley et al. | |
| 2006/0080680 A1 | 4/2006 | Anwar et al. | |
| 2006/0095454 A1 | 5/2006 | Shankar et al. | |
| 2006/0101518 A1 | 5/2006 | Schumaker et al. | |
| 2006/0130145 A1 | 6/2006 | Choi et al. | |
| 2006/0150238 A1 | 7/2006 | D'Agostino | |
| 2006/0150256 A1 | 7/2006 | Fanton et al. | |
| 2006/0179485 A1 | 8/2006 | Longsine et al. | |
| 2006/0217115 A1 | 9/2006 | Cassett et al. | |
| 2006/0218482 A1 | 9/2006 | Ralston et al. | |
| 2006/0224742 A1 | 10/2006 | Shahbazi | |
| 2006/0236325 A1 | 10/2006 | Rao et al. | |
| 2006/0253205 A1 | 11/2006 | Gardiner | |
| 2006/0253584 A1 | 11/2006 | Dixon et al. | |
| 2006/0272011 A1 | 11/2006 | Ide et al. | |
| 2006/0277408 A1 | 12/2006 | Bhat et al. | |
| 2006/0294582 A1 | 12/2006 | Linsley-Hood et al. | |
| 2007/0005327 A1 | 1/2007 | Ferris | |
| 2007/0011319 A1 | 1/2007 | Mcclure et al. | |
| 2007/0015519 A1 | 1/2007 | Casey | |
| 2007/0016953 A1 | 1/2007 | Morris et al. | |
| 2007/0016955 A1 | 1/2007 | Goldberg et al. | |

(56) References Cited

U.S. PATENT DOCUMENTS

| | | |
|---|---|---|
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214504 A1 | 9/2007 | Milani Comparetti et al. |
| 2007/0220608 A1 | 9/2007 | Lahti et al. |
| 2007/0240127 A1 | 10/2007 | Roques et al. |
| 2007/0240218 A1 | 10/2007 | Tuvell et al. |
| 2007/0240221 A1 | 10/2007 | Tuvell et al. |
| 2007/0240222 A1 | 10/2007 | Tuvell et al. |
| 2007/0248047 A1 | 10/2007 | Shorty et al. |
| 2007/0250627 A1 | 10/2007 | May et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1* | 3/2008 | Herschaft ............... 726/25 |
| 2008/0086773 A1* | 4/2008 | Tuvell et al. ............ 726/23 |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1* | 6/2008 | Shinde et al. ............ 726/1 |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1 | 9/2008 | Soderberg et al. |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1 | 12/2008 | Featherstone et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0293125 A1 | 11/2009 | Szor |
| 2010/0019731 A1 | 1/2010 | Connolly et al. |
| 2010/0064341 A1 | 3/2010 | Aldera |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0154032 A1 | 6/2010 | Ollmann |
| 2010/0210240 A1 | 8/2010 | Mahaffey et al. |
| 2010/0240419 A1 | 9/2010 | Horino |
| 2010/0313270 A1 | 12/2010 | Kim et al. |
| 2010/0317324 A1 | 12/2010 | Brown et al. |
| 2010/0332593 A1 | 12/2010 | Barash et al. |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Mahaffey et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0233695 A1 | 9/2012 | Mahaffey et al. |
| 2012/0259954 A1 | 10/2012 | McCarthy et al. |
| 2012/0303735 A1 | 11/2012 | Raciborski et al. |
| 2012/0317233 A1 | 12/2012 | Redpath |
| 2012/0324076 A1 | 12/2012 | Zerr et al. |
| 2012/0324094 A1 | 12/2012 | Wyatt et al. |
| 2012/0324568 A1 | 12/2012 | Wyatt et al. |
| 2013/0019311 A1 | 1/2013 | Swildens et al. |
| 2013/0023209 A1 | 1/2013 | Fisher et al. |
| 2013/0041974 A1 | 2/2013 | Luna et al. |
| 2013/0047034 A1 | 2/2013 | Salomon et al. |
| 2013/0086682 A1 | 4/2013 | Mahaffey et al. |

FOREIGN PATENT DOCUMENTS

| | | |
|---|---|---|
| WO | 2005101789 | 10/2005 |
| WO | 2006110181 | 10/2006 |
| WO | 2008007111 | 1/2008 |
| WO | 2008057737 | 5/2008 |
| WO | 2010048218 | 4/2010 |
| WO | 2010048220 | 4/2010 |
| WO | 2012027588 | 1/2012 |

OTHER PUBLICATIONS

Prey, available at <http://preyproject.com/>, retrieved Jan. 10, 2012, 4 pages.

Qualys, "Executive Dashboard," Internet Archive, Way back Machine, availble at <http://web.archive.org/web20080507161417/www.qualys.com/products/screens/?screen=Executive+Dashboard>, retrieved Feb. 23, 2011, 1 page.

Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.

Real world Computing, Jun. 16, 2008 (PC Pro), pp. 1-2.

Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.

Teh, Joe, "Norton 360 Version 3.0 Review, "Mar. 9, 2009, Available at <http://techielobang-com/blog/2009/03/09/norton-360-version-30-review/> Retrieved Feb. 23, 2011, 12 pages.

Trillian, available at <http://www.trillian.im/>, retrieved Sep. 14, 2011, 24 pages.

Virus Total, VT Community, www.virustotal.com/index.html; Dated Dec. 16, 2011; 44 Pages.

Windows Update, Internet Archive, Way Back Machine, available at <http://web.archive.org/web/20071022193017/http://en.wikipedia.org/wiki/Windows_Update> Retrieved Feb. 23, 2011, 3 pages.

Sprite Mobile, Sprite Backup, Internet Archive, Way Back Machine, available at http://web.archive.org/web/20080901220103/http://www.spritesoftware.com/?page_id=280, 4 pages, Retrieved Jan. 16, 2013.

(56) References Cited

OTHER PUBLICATIONS

Sprint Nextel, Mobile Locator, Internet Archive, Way Back Machine, available at http://web.archive.org/web/20080901070835/http://www.nextel.com/en/solutions/gps/mobile_locator.shtml, 2 pages, Retrieved Jan. 16, 2013.
Richardson, Alexis "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.
Fisher, Oliver "Malware? We Don't Need No Stinking Malware!," Google, Oct. 24, 2008, available at <http://googlewebmastercentral.blogspot.com/2008/10/malware-we-dont-need-no-stinking.html>, retrieved Mar. 30 2012, 11 pages.
Reardon, Marguerite "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.
Fette, Ian "Understanding Phishing and Malware Protection in Google Chrome," The Chromium Blog, Nov. 14, 2008, available at <http://blog.chromium.org/2008/11/understanding-phishing-and-malware.htm>, retrieved May 17, 2011, 6 pages.
Kincaid, Jason "Urban Airship Brings Easy Push Notifications to Android," TechCrunch, Aug. 10, 2010, available at <http://techcrunch.com/2010/08/10/urban-airship-brings-easy-push-notifications-to-android/>, retrieved Jun. 16, 2011, 5 pages.
Keane, Justin K. "Using the Google Safe Browsing API from PHP," Mad Irish, Aug. 7, 2009, available at <http://www.madirish.net/node/245>, retrieved Mar. 30, 2012, 5 pages.
Jefferies, Charles P. "Webroot AntiVirus 2010 With Spy Sweeper Review," Notebook Review, Jun. 22, 2010, available at <http://http://www.notebookreview.com/default.asp?newsID=5700&review=Webroot+AntiVirus+2010+With+Spy+Sweeper+Review>, retrieved May 18, 2011, 3 pages.
"Berry Locator", 2007, Mobireport LLC, 1 page.
"Firefox", Wikipedia, Jul. 20, 2011, available at <http://en.wikipedia.org/wiki/firefox> Retrieved Aug. 10, 2011, 37 Pages.
"F-Secure Mobile Security for S60 Users Guide", F-Secure Corporation 2009, pp. 1-34.
"Java Virtual Machine", Wikipedia, Aug. 7, 2011, Available at <http://en.wikipedia.org/wiki/Java_Virtual_Machine> Retrieved Aug. 10, 2011, 7 pages.
"Kaspersky Mobile Security", Kaspersky Lab 1997-2007, 1 page.
"Kaspersky Mobile Security", Kaspersky Lab 2008, available at <http://www.kaspersky.com/kaspersky_mobile_security> Retrieved Sep. 11, 2008, 2 Pages.
"Norton Smartphone Security",Symantec, 2007, Available at <http://www.symantec.com/norton/smartphone-security> Retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Symantec Endpoint Protection", Symantec, 2008, Available at <http://www.symantec.com/business/products/family.jsp?familyid=endpointsecurity>, 6 pages.
"Symantec Mobile Security Suite for Windows Mobile", Symantec, 2008 Available at <http://www.symantec.com/business/products/sysreq.jsp?pcid=2241&pvid=mobile_security_suite_1>, 5 pages.
"TippingPoint Security Management System (SMS)", TippingPoint, Available at <http://www.tippingpoint.com/products_sms.html>, 2 pages.
Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-find-out-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.

"BlackBerry Push Service Overview," Dec. 16, 2009, available at <http://us.blackberry.com/developers/platform/pushapi.jsp#tab_tab_resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/8273/esoft-unveils-sitefilter-30-for-oems/>, retrieved Mar. 30, 2012, 2 pages.
"Get the Physical Location of Wireless Router From its MAC Address (BSSID)," Coderrr, Sep. 10, 2008, available at <http://coderrr.wordpress.com/2008/09/10/get-the-physical-location-of-wireless-router-from-its-mac-address-bssid/>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.
Mytton, David "How to Build an Apple Push Notification Provider Server (Tutorial)," Server Density, Jul. 10, 2009, available at <http://blog.serverdensity.com/2009/07/10/how-to-build-an-apple-push-notification-provider-server-tutorial/>, retrieved Apr. 2, 2012, 33 pages.
"Pidgin the Universal Chat Client," Pidign, available at <http://www.pidgin.im/>, retrieved Sep. 14, 2011, 14 pages.
Pogue, David "Simplifying the Lives of Web Users," The New York Times, Aug. 18, 2010, available at <http://www.nytimes.com/2010/08/19/technology/personaltech/19pogue.html>, retrieved May 17, 2011, 5 pages.
"Twilio Cloud Communications Web Service API for Building Voice and SMS Applications," Twilio available at <http://www.twilio.com>, retrieved Sep. 14, 2011, 12 pages.
"Understanding Direct Push," Microsoft, Feb. 18, 2009, available at <http://technet.microsoft.com/en-us/library/aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https://zvelo.com/technology/zvelodb-url-database>, retrieved Mar. 30, 2012, 2 pages.
Amazon.com: Mining the Web Discovering Knowledge from Hypertext Data (9781558607545): Soumen Chakrabarti: Books, Amazon available at <http://www.amazon.com/exec/obidos/ASIN/1558607544/>, retrieved Jun. 7, 2012, pp. 1-7.
Clickatell, available at <http://www.clickatell.com>, retrieved Sep. 14, 2011, 11 pages.
Dolcourt, Jessica Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al., Focused Crawling Using Context Graphs:, Proceedings of the 26th VLDB Conference, Cairo, Egypt, 2000, pp. 1-8.
Grafio "Stay Secure", Opera Software, Sep. 29, 2008, Available at <http://widgets.opera.com/widget/4495> Retrieved Oct. 21, 2008, 4 pages.
McAfee, Internet Archive, Way Back Machine, available at <http://web.archive.org/web/20080611095201/www.qualys.com/solutions/vulnerability_management>retrieved Feb. 24, 2011, 1 page.
PagerDuty, available at <http://www.pagerduty.com>, retrieved Sep. 14, 2011, 23 pages.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010; pp. 1-16.
PCT International Search Report and Written Opinion of the International Searching Authority for PCT/US2011/049182; Mailed on Dec. 23, 2011; pp. 1-11.
HTC "Mobile Wipe Smart Phone Management", pp. 1-4, published on Dec. 5, 2007, retrieved on Dec. 5, 2007.

(56) References Cited

OTHER PUBLICATIONS

"Virgin Media—Phone Lost or Stolen?", web page downloaded Apr. 11, 2013 from http://www.virginmobile.com/vm/ukCoverage.do?contentId=insurance.howdoi.sm283.

"Sprint—Report that your device is lost or stolen", web page downloaded Apr. 11, 2013 from http://support.sprint.com/support/article/Report_that_your_device_is_lost_or_stolen/case-ba416758-20090629-143222.

PCT "International Search Report and Written Opinion of the International Searching Authority for PCT/US2013/027166", mailed on Jun. 19, 2013; received on Jun. 21, 2013.

Tedeschi, Bob, "In Choosing a New Phone, Online Research Goes Only So Far", The New York Times, Oct. 7, 2009; downloaded Jul. 13, 2013 from http://www.nytimes.com/2009/10/08/technology/personaltech/08smat.html?_r=0.

* cited by examiner

ENFORCING SECURITY BASED ON A SECURITY STATE ASSESSMENT OF A MOBILE DEVICE

CROSS REFERENCE TO RELATED APPLICATIONS

The present application is a continuation of U.S. patent application Ser. No. 13/314,032, filed Dec. 7, 2011, entitled "Providing Access Levels to Services Based Upon Mobile Device Security State," now U.S. Pat. No. 8,365,252, which is a continuation of U.S. patent application Ser. No. 12/255,632, filed Oct. 21, 2008, entitled "SECURE MOBILE PLATFORM SYSTEM," now U.S. Pat. No. 8,087,067, which is related to the following U.S. Patents and U.S. Patent Applications: U.S. patent application Ser. No. 12/255,635, filed Oct. 21, 2008, issued as U.S. Pat. No. 8,060,936 on Nov. 15, 2011, entitled "SECURITY STATUS AND INFORMATION DISPLAY SYSTEM," U.S. patent application Ser. No. 12/255,626, filed Oct. 21, 2008, entitled "SYSTEM AND METHOD FOR A Mobile Cross-Platform Software System," now U.S. Pat. No. 8,099,472, U.S. patent application Ser. No. 12/255,621, filed Oct. 21, 2008, "SYSTEM AND METHOD FOR ATTACK AND MALWARE PREVENTION," now U.S. Pat. No. 8,108,933, and U.S. patent application Ser. No. 12/255,614, filed Oct. 21, 2008, issued as U.S. Pat. No. 8,051,480 on Nov. 1, 2011, entitled "SYSTEM AND METHOD FOR MONITORING AND ANALYZING MULTIPLE INTERFACES AND MULTIPLE PROTOCOLS," all of which are hereby incorporated by reference.

FIELD

The present invention relates generally to mobile security, and specifically, to establishing a secure mobile platform system on a mobile communications device to enable secure transactions between the mobile communications device and a service provider, for example, a financial services transaction.

BACKGROUND

Because of inherent security concerns, mobile communications devices such as mobile phones, PDAs, and smartphones have yet to provide the same breadth of trusted connectivity found on desktop and laptop computer platforms. For example, mobile device users are less likely to access confidential information and/or perform financial transactions with a mobile communications device because such devices are not sufficiently secure. Similarly, service providers such as banks, online payment services and providers of confidential information are less likely to offer access to their services through mobile communications devices. As a result, mobile communications device users are limited by the types and availability of many online services. This is because present methods for securing mobile communications devices do not contemplate many ways users may wish to access online services and online service providers, and are therefore inadequate for providing a secure platform for access to and from online services or service providers.

Previous methods for securing mobile communications devices focus on an all-or-nothing approach. Access to or from the mobile device is either granted or not granted based upon whether the device meets certain standards, possesses certain configurations, or adheres to certain policy rules. If the device passes these standards, access is granted. If the device is deficient in any way, access is denied. Such an approach does not consider the types or levels of access required by certain service providers, nor does this approach contemplate the security and repair capabilities of the device itself. Indeed, prior art security systems and methods ignore the recent activity of the mobile device in relation to its overall security state. Furthermore, prior art security systems are typically limited to authorizing access to a given network, making them unsuitable for controlling access and access levels to services and service providers based on a device's security state.

What is therefore needed is a system and method for providing security for mobile communications devices that considers the security state of the device and provides a platform for integrating with services and service providers.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention is a system and method for creating a customizable secure environment on a mobile communications device in order to permit safe access to and from trusted services. The present invention is not limited to a simple grant or denial of access to the mobile communications device, nor is the present invention limited to network or protocol authorization. The present invention allows mobile communications device users to access services, and allows service providers to access a mobile communications device with the confidence that the mobile communications device, or portions of the mobile communications device, is secure. As used herein, the term "mobile communications device" refers to mobile phones, PDAs and smartphones, but excludes laptop computers, notebook computers or sub-notebook computers. In the present application, mobile communication device may also be referred to as "handset," "device," "mobile client" or "client." Specifically, mobile communications devices include devices for which voice communications are a primary function, but may offer data or other wireless Internet access capabilities, including Bluetooth, infrared, or wireless Internet access.

It should be appreciated that the present invention can be implemented in numerous ways, including as a process, an apparatus, a system, a device, a method, or a computer readable medium such as a computer readable storage medium containing computer readable instructions or computer program code, or a computer network wherein computer readable instructions or computer program code are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

A. The Secure Mobile Platform System

Figure 1:
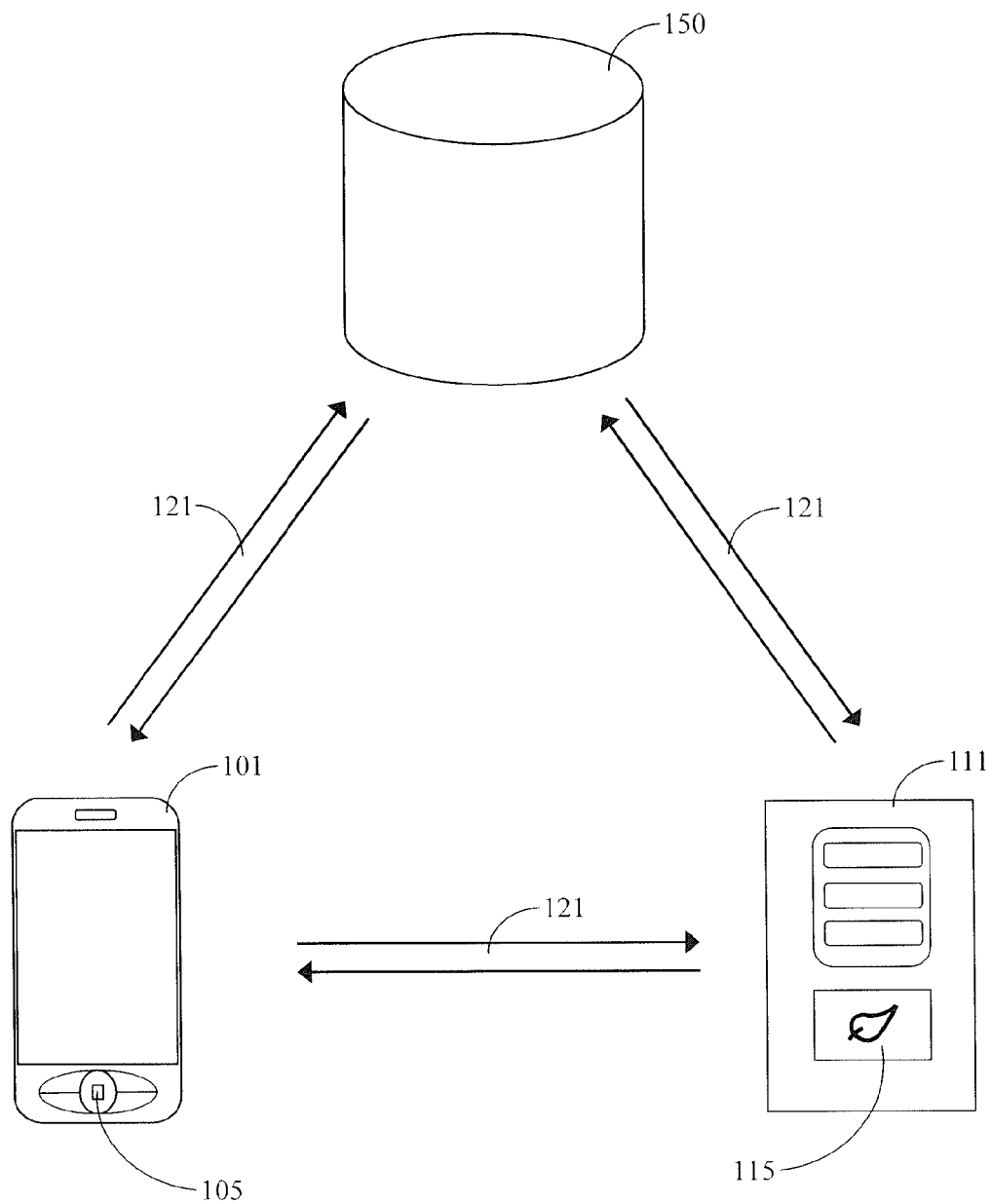
FIG. 1 is an exemplary block diagram depicting an embodiment of the present invention.

FIG. 1 illustrates the various components that may comprise a system embodiment of the present invention. As shown, mobile communications device 101 is connected to a network 121. Network 121 may include access to different communications protocols, such as a wireless network, a cellular network, Bluetooth, infrared, Wi-Fi or any other network that device 101 may access. Network 121 provides a communications link between device 101 and server 111. In this fashion, network 121 may carry communications between device 101 and server 111, or between device 101 and service provider 150, or between server 111 and service provider 150. Network 121 may also carry communications between other wireless network or wireless Internet components not pictured in FIG. 1.

One skilled in the art will appreciate that the present invention comprises a local software component 105 installed on device 101. In an embodiment, local software component 105 may be responsible for maintaining a secure line of communication with server 111 over network 121. In addition, local software component 105 may manage requests for access to and from device 101. As will be discussed further below, managing requests for access may include requests between device 101 and service provider 150, requests between service provider 150 and server 111, requests between device 101 and server 111, etc. In an embodiment, these requests may be managed in whole or in part by server 111, or may be managed in whole or in part by a remote software component 115 residing on server 111. Remote software component 115 may be responsible for maintaining a secure line of communication with device 105 or service provider 150 over network 121. One will appreciate that in the examples discussed herein, reference may be made to communications between device 101, server 111 and service provider 150. One skilled in the art will appreciate that these communications may actually be between local software component 105, remote software component 115 and service provider 150. Other variations are also possible without departing from this disclosure or the scope of the invention.

A person having skill in the art will also appreciate that the system illustrated in FIG. 1 is merely exemplary, and that additional components or configurations may be incorporated without departing from this disclosure or the scope of the invention. For example, server 111 may be connected over network 121 to multiple mobile communications devices, and/or multiple service providers, and/or other servers. In another example, service provider 150 may host server 111. Alternatively, service provider 150 may manage server 111, in which case the services provided by service provider 150 may be hosted by server 111 in addition to the secure mobile platform system provided by server 111.

B. Secure Mobile

1. Security State

As discussed above, access to various sensitive services is currently neither available nor encouraged on a mobile communications device because the state of its security is often unknown. In order to assure service providers that a device is secure, the present invention provides information on recent security events, if any. Security events include but are not limited to finding possible threats such as exploits, suspicious network traffic, viruses, malware, suspicious system or function calls, authentication failures, etc. Security events may also include hardware or physical issues with the mobile communications device, such as a broken antenna, a cracked screen or case, or a malfunctioning Bluetooth or infrared sensor. Systems and methods for detecting and assessing security events are discussed in co-pending U.S. patent application Ser. No. 12/255,621, entitled "SYSTEM AND METHOD FOR ATTACK AND MALWARE PREVENTION," NOW U.S. Pat. No. 8,108,933, which is hereby incorporated by reference.

Using the system illustrated in FIG. 1, the present invention may provide a dynamic assessment of the security of device 101, also termed device 101's "security state" or "state." An assessment of device 101's state may be performed in whole or in part by remote software component 115 on server 111, in whole or in part by local software component 105 on device 101, or a combination of the two. One will appreciate that as used herein, the data or information used to determine device 101's state may be called "security state information," and the resulting assessment using this information may be called device 101's "state." Device 101's state therefore reflects the its current, recent or historic level of security, and may be a measure, calculation or assessment of the security level of device in light of recent security events or other security state information. Device 101's state may also reflect attempts to repair or recover device 101 from harmful security events.

An assessment of the device's state can be made in any number of ways, from logging or counting the number of security events that have recently occurred, to calculating a rating or score based upon weighing the severities of various security events and determining if any events interact. For example, the device may have recently been subjected to any single security event or a set number of security events, at which point the device's state may be classified as "not secure," and thereby not be able to access any service provider or be able to be accessed by any service provider. Alternatively, events such as viruses that may be spread to other devices may be considered severe security events, whereas suspicious network traffic may be considered less severe. If such events are scaled based on severity, the device may be scored accordingly or not classified as "not secure" until the score reaches a certain acceptable limit. In either scenario, if the event is repaired, such as by removing or quarantining the virus, deleting the infected email or message, etc., then the state of the device may improve or otherwise change. In this fashion, a device's state is a dynamic assessment. When a device's state is referenced, it may either be at the time of reference or a time range. Historical data for a device's state may be stored on device 101, on server 111, or a combination of the two. Similarly, data about the device, including its state and information on recent security events, may be stored on device 101, on server 111, or a combination of the two.

Figure 2:
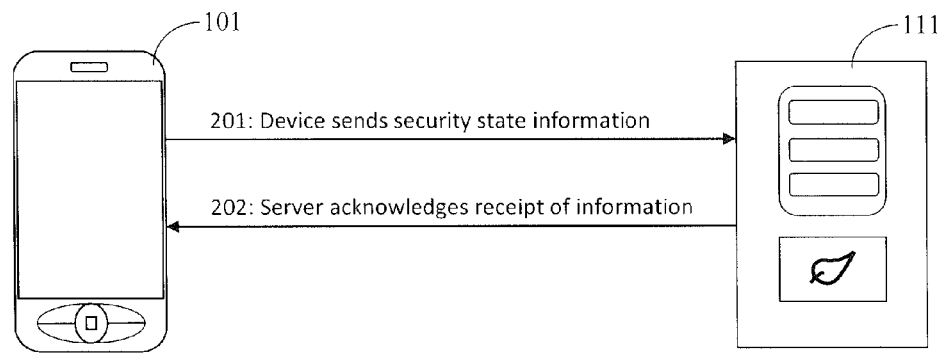
FIG. 2 is an exemplary messaging diagram illustrating the flow of communications according to an embodiment of the present invention.

In an embodiment, a device's state may be reported or displayed on device 101, or outputted to server 111. Systems and methods for displaying state information and other security event-related information are discussed in co-pending U.S. patent application Ser. No. 12/255,635, filed Oct. 21, 2008, issued as U.S. Pat. No. 8,060,936 on Nov. 15, 2011 entitled "SECURITY STATUS AND INFORMATION DISPLAY SYSTEM," which is hereby incorporated by reference. In an embodiment, a device's state may be sent to server 111 so that it has the most updated security state information about the device. This security state information may also include the device's identifier, configuration, settings, information on recent security events, as well as the device's state. As shown in FIG. 2, mobile communications device 101 may send this security data to server 111 over network 121 (step 201). In step 202, server 111 may acknowledge receipt of the security data from device 101.

Figure 3:
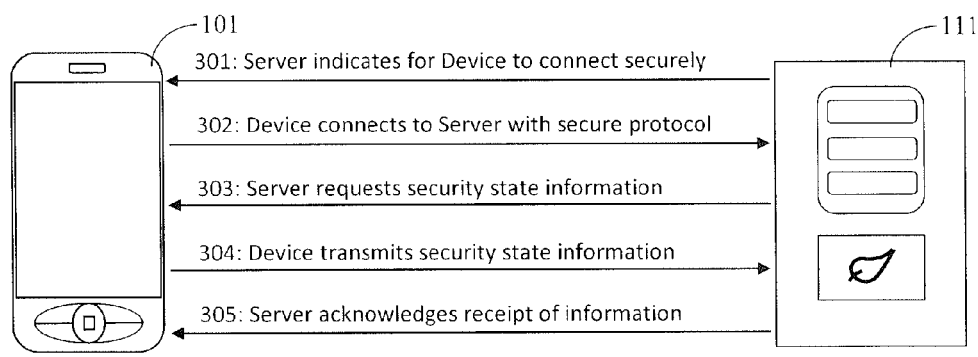
FIG. 3 is an exemplary messaging diagram illustrating the flow of communications according to an embodiment of the present invention.

In an embodiment, server 111 may initiate a request for device 101's security state information. This may occur if device 101 has not recently sent its security state information to server 101 in accordance with an update or data synchronization schedule, or if server 111 is communicating with device 101 for the first time. As shown in FIG. 3, server 111 may request that device 101 connect to server 111 using a secure protocol (step 301). In step 302, device 101 connects to server 111 over network 121 using the secure protocol indicated by server 111. In step 303, server 111 may request device 101's security state information, which device 101 transmits in step 304. In step 305, server 111 may acknowledge receipt of the security state information. Therefore, as shown in FIGS. 2 and 3, the present invention provides for two sources of a mobile communications device 101's security state information: the device itself, or on a secure server 111 that communicates with device 101. This information may be stored in a database, table or other memory on device 101 or server 111, or may form part of the local software component 105 or remote software component 115. One will appreciate that other sources of a mobile communications device's security state information are possible without departing from this disclosure or the scope of the present invention, and that FIGS. 2 and 3 are merely exemplary and are not intended to limit the present invention.

In an embodiment, the process for assessing the security state information for device 101 may be performed by the remote software component 115 on server 111. In this embodiment, the security state information may be received as raw or partially processed data from device 101. Server 111 may also store a database of security events and may compare device 101's security state information against information in this database in order to assess a severity, score or other determination of device 101's state. In an embodiment, this processing and assessment may be performed in whole or in part on device 101. One will appreciate that other methods for processing security state information or data to assess a mobile communications device's security state information are possible without departing from this disclosure or the scope of the present invention.

In an embodiment, the state of the device 101 may be a function of having installed a particular security software application. In other words, if this application is present on device 101, then its state may be considered "secure," and able to request or accept access from a service provider 150. The application may enable secure communications with the service provider 150 or with a trusted server 111. Similarly, the state of device 101 may be a function of having access to a specific server 111 or remote software component 115 capable of monitoring activities on the mobile communications device 101. Access may be granted through the secure server 111, which then establishes a trusted and secure communications link 121 with mobile device 101. In this fashion, device 101 is considered secure since communications to and from the device must go through secure server 111.

2. Access

In an embodiment, the level of access that service provider 150 has to mobile communications device 101, and/or the level of access that device 101 has to service provider 150, may depend upon the device's state, either at the time access is requested, or based upon historical data for the device's state, or based upon security state information stored on server 111 for device 101. One will appreciate that "access" to and by mobile communications device 101 may have different meanings based upon the service provided by service provider 150. One will also appreciate that the method for granting access or processing requests for access may be performed in whole or in part by service provider 150, server 111 (on its own or as a proxy server for service provider 150), or a remote software component 115 on server 111. For example, if service provider 150 is a bank or similar financial institution, access may include checking an account balance, viewing previous financial transactions, transferring funds, etc. Access may include all of the activities typically conducted on website accessed by a desktop computer. However, if the mobile communications device 101 is compromised in any manner, and therefore exists in a "not secure" state, then access may be limited or even denied. For example, device 101 may only be able to check an account balance, but not transfer any funds. Alternatively, device 101 may be denied any access to service provider 150, and/or service provider 150 may not have any access to device 101. Service provider 150 may customize the level of allowable access based upon given states, or the level of access may be automatically determined by device 101, local component 105, server 111 and/or remote component 115.

In another example, service provider 150 may be a web application provider, such as Google® Docs or Zoho®. Alternatively, service provider 150 may be an organization that provides access to online documentation or other sensitive materials over the web. Using the present invention, a service provider 150 may be able to adjust access based upon the state of the device. For example, a device 101 in a severely compromised state may be denied from accessing service provider 150's website, or may be limited to only viewing a list of documents or files, or may be limited to viewing portions of the files. A device 101 that is not compromised may be able to access, edit, send, upload or perform other activities on the service provider 150's site. One will appreciate that other levels of access and interaction are available based upon device 101's state.

In another example, access may simply be a response returned following a request for security state information and/or the state of a mobile communications device. A service provider 150 or other third party may already have established communication with a mobile communications device, or the mobile communications device user may already be a user of the services provided by service provider 150. The present invention may have subsequently implemented, and service provider 150 may wish to check on the status of a mobile communications device. As such, service provider 150 may send a query to device 101 for its security state, or alternatively, service provider 150 may send a query server 111 that maintains updated security state information on device 101. The present invention provides a way for a service provider 150 to quickly and simply access information on a mobile communication device's security state without having to install or maintain its own security system network.

Various methods for enabling access to mobile communications device 101 are described in detail below. Access may originate as a request from mobile device 101 to service provider 150. As will be described in more detail below, this request may be passed through server 111. Alternatively, a request for access may originate from service provider 150, in which case the request may be directed toward device 101, or passed through server 111. In any case, an embodiment of the present invention provides a secure mobile platform system in which the level of interactivity between the mobile communications device 101 and the service provider 150 depends upon the state and security of device 101. Different examples are outlined further below, and are illustrated in the accompanying figures. However, one skilled in the art will appreciate that the following are merely exemplary, and not intended to limit the scope of the invention in any way.

a. Device to Server to Service Provider

Figure 4:
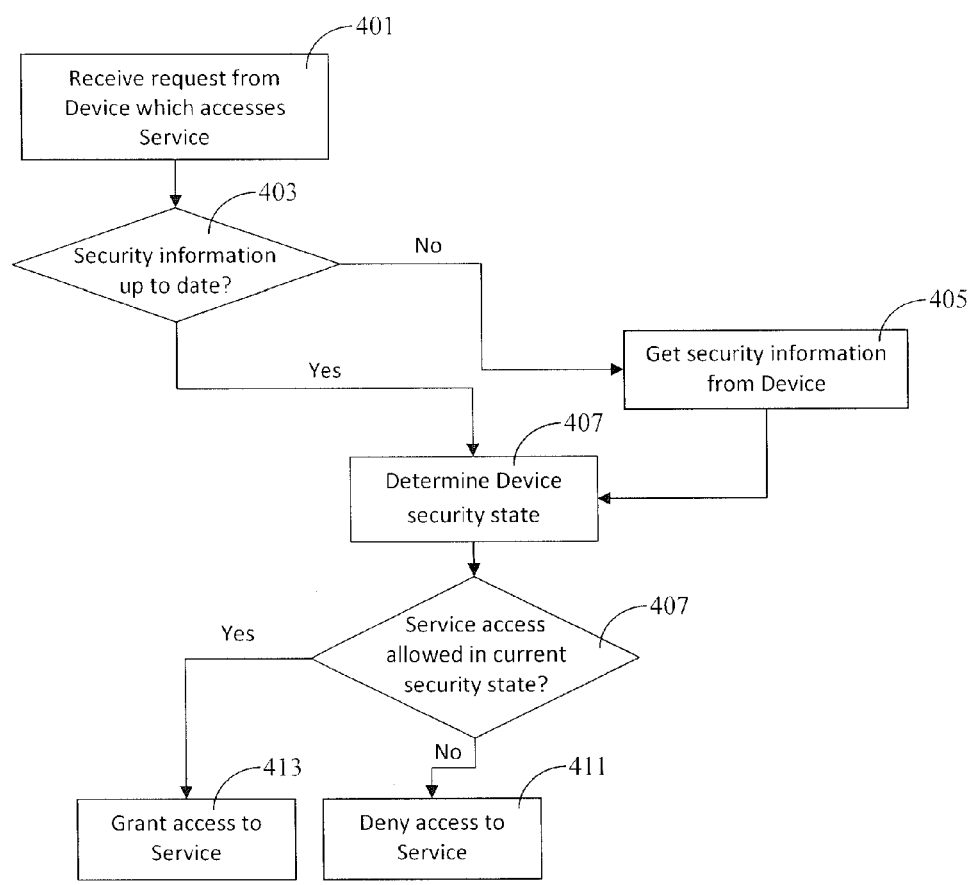
FIG. 4 is an exemplary flow diagram illustrating the steps of an embodiment of the present invention.

In an embodiment, the user of a mobile communications device 101 may request access to service provider 150. As illustrated above, this may be an embodiment where the user attempts to access a banking service or other network based service using software installed on a handset. As shown in FIG. 4, this request may be managed by server 111, which receives the request from device 101 (step 401). Server 111 may access a database or other memory to determine whether it has updated security state information for device 101 (step 403). If not, then in step 405, this security state information is obtained from device 101. Once obtained, the security state for device 101 may be assessed (step 407). This assessment may be any method as described previously or incorporated by reference. If the security state is acceptable, then device 101 may have access to service provider 150 (step 413). If device 101's security state is unacceptable, then access may be limited or denied (step 411). As previously discussed, the acceptability of a device's security state and the level of access to the mobile communications device 101 may be set by the provider of server 111, the service provider 150, the manufacturer or provider of device 101, or other parties responsible for managing the system of the present invention.

b. Service Provider to Device

In an embodiment, service provider 150 may wish to query server 111 for the security status, security state or to gain security state information for a mobile communications device monitored or managed by server 111. In an embodiment, service provider 150 may not manage server 111, but may have a trust relationship with server 111 in order to allow access to the security state of device 101. In another embodiment, service provider 150 may manage server 111 and have an implicit trust relationship to allow the service to access the security state of the device. In either instance, service provider 150 may have the ability to communicate securely and directly with device 101 without using the server 111 to proxy or otherwise enable the connection.

Figure 5:
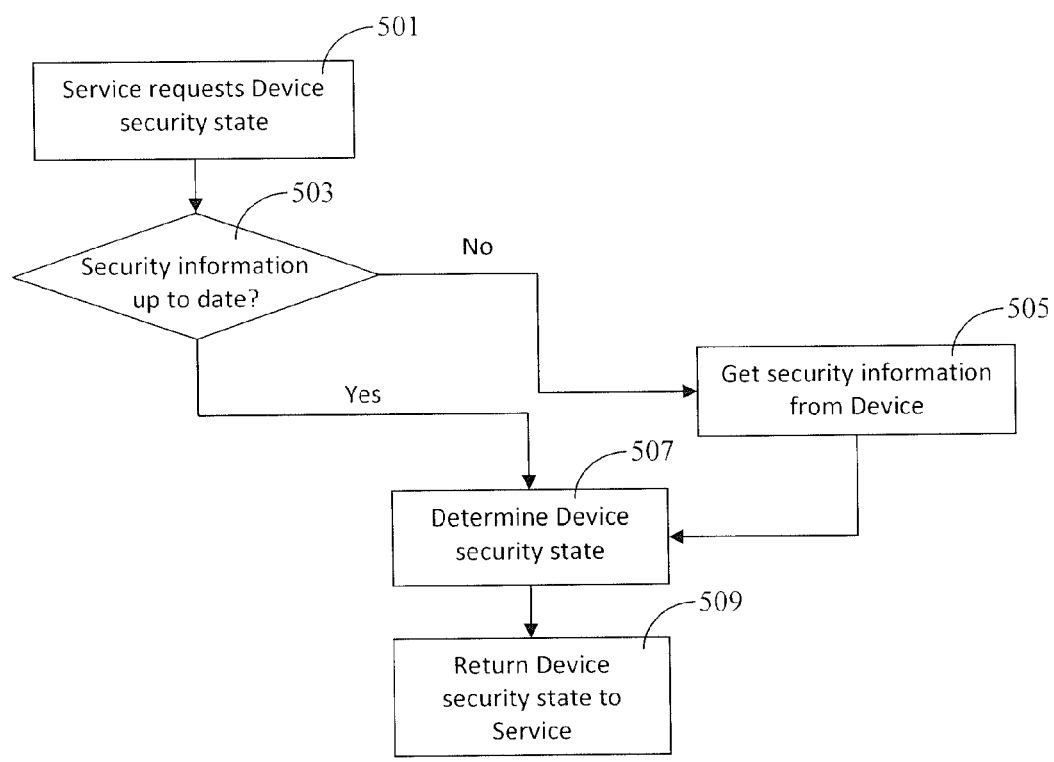
FIG. 5 is an exemplary flow diagram illustrating the steps of an embodiment of the present invention.

FIG. 5 illustrates a method by which a service provider 150 may request device 101's security state. In step 501, the service provider 150 initiates the request to get mobile communication device 101's security state from server 111. In step 503, server 111 checks to see if there is updated security state information for device 101. This may require communicating with a database or memory store storing such information, or communicating directly with device 101. If the information is not updated, then in step 505, server 111 obtains the security state information from device 101. Once this information is obtained, then in step 507, server 111 determines the state of device 101. In step 509, device 101's state may be stored in a server 111 managed by service provider 150 or stored in a database or memory store accessible by service provider 150. This method may provide service provider 150 with a continuously updated overview of the security state of a mobile communications device 101 accessed by service provider 150.

In an embodiment, the server 111 may provide access to the security state of a device 101 through an API over a protocol such as HTTP. This API may have encryption and require authentication for a service provider 150 to retrieve security state information corresponding to a mobile communications device. As such, service provider 150 may perform step 501 of FIG. 5 by using the API. Alternatively, the server 111 may access an API hosted by service provider 150 whenever the security state of device 101 changes to update the service provider 150 with the newest state information.

As such, the present invention provides a simple implementation by which service providers can be updated on the security state of a device 101 monitored by server 111. This provides a significant advantage over prior art that requires installation of a security system or portions of a security system, and delegates security monitoring to a server specifically tailored for the task.

c. Service Provider to Server to Device

Figure 6:
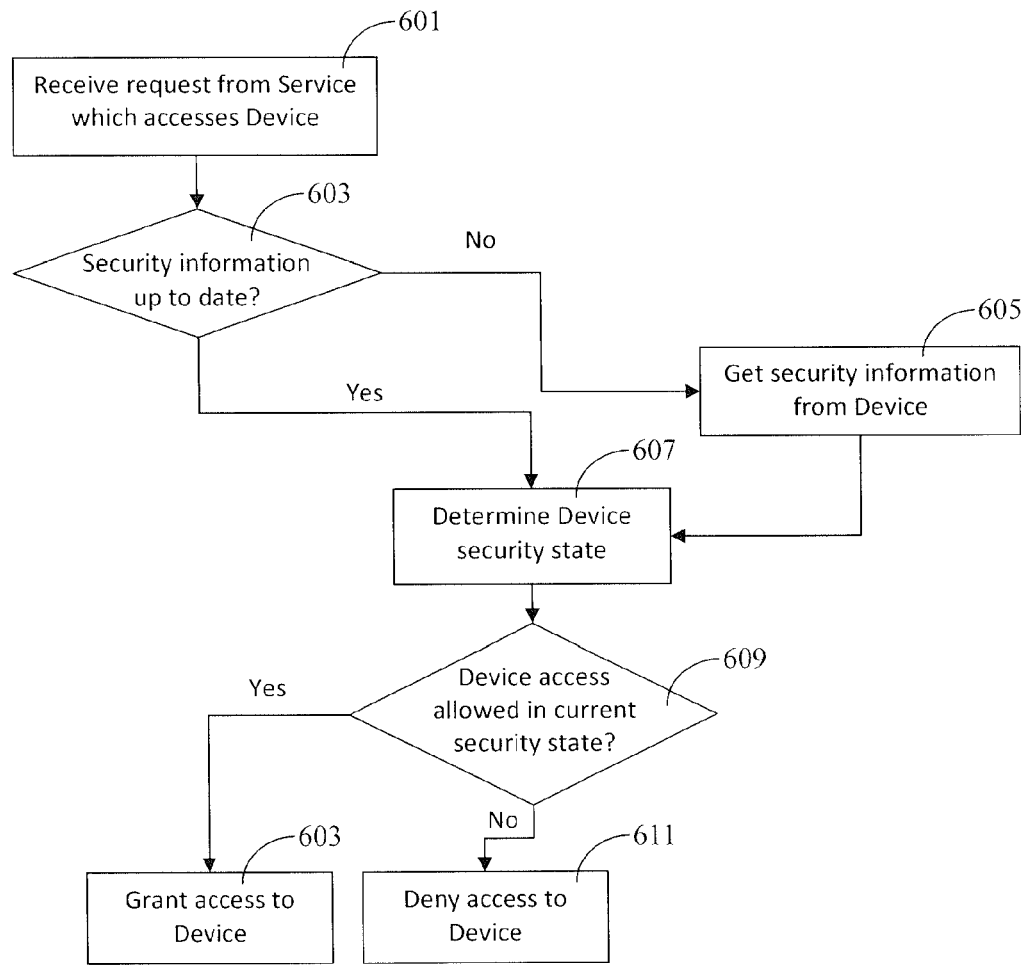
FIG. 6 is an exemplary flow diagram illustrating the steps of an embodiment of the present invention.

In an embodiment, service provider 150 may request access to device 101 through server 111. In other words, server 111 may be responsible for processing or proxying requests for access based upon device 101's state. If device 101 is in an acceptable state, server 111 may provide the desired access to device 101 by service provider 150. This is shown in FIG. 6.

In step 601, server 111 receives a request from service provider 150 to access device 101. One will appreciate that server 111 may be responsible for proxying access to device 101 from service provider 150, or service provider 150 may be allowed to access device 101 directly. In step 603, server 111 may check to see if the security state information for device 101 is up to date. Alternatively, this check may be performed by service provider 150 before or after it passes the request for device 101 to the server 111. If the security state information for device 101 is not updated, then this information is obtained from device 101 (step 605). In step 607, server 111 assesses device 101's state based upon the information received. This step may also be performed by the service provider 150. Once device 101's state is determined, server 111 or service provider 150 or a combination of the two may determine whether device 101's security state is acceptable (step 609). If not, access may be limited or denied (step 611). If it is acceptable, then service provider 150 may have access to device 101 (step 613).

In an embodiment, a variation of the above steps may be performed when service provider 150 directly requests access to device 101, but device 101 passes the request to server 111. In this embodiment, the steps of checking whether security state information for device 101 is updated (step 603), obtaining device 101's security state information (step 605), assessing device 101's security state (step 607) then granting (step 613) or denying (step 611) service provider 150 access to device 101 may be all be performed by server 111.

Similarly, in an embodiment, service provider may directly request access to device 101, and device 101 may itself determine whether it is in an acceptable state. This may require that device 101 run a separate process that oversees the security state of the device 101. If the process is not kept separate from device 101's other running functions, then it may be compromised by malware or other security event that tricks device 101 into presenting that it is more secure than it may in fact be. One skilled in the art will appreciate that other methods for self-monitoring device 101's security state are possible.

d. Conditional Access to Device

As mentioned previously, service provider 150 may be granted limited or conditional access depending upon the state of device 101. Such things as recent security events, unsuccessfully quarantined viruses, or hardware issues may prevent normal access to device 101. As such, the present invention contemplates instances where access may be limited in order to protect the overall secure mobile platform system and prevent contamination of other system components. In an embodiment, limited or conditional access may be decided by server 111 which may proxy the request for access to or from device 101 or may process the request locally. One will appreciate that if device 101 is attempting to access service provider 150, but is not in a sufficiently secure state, the request may be denied without notifying service provider 150 of the attempted access.

Figure 7:
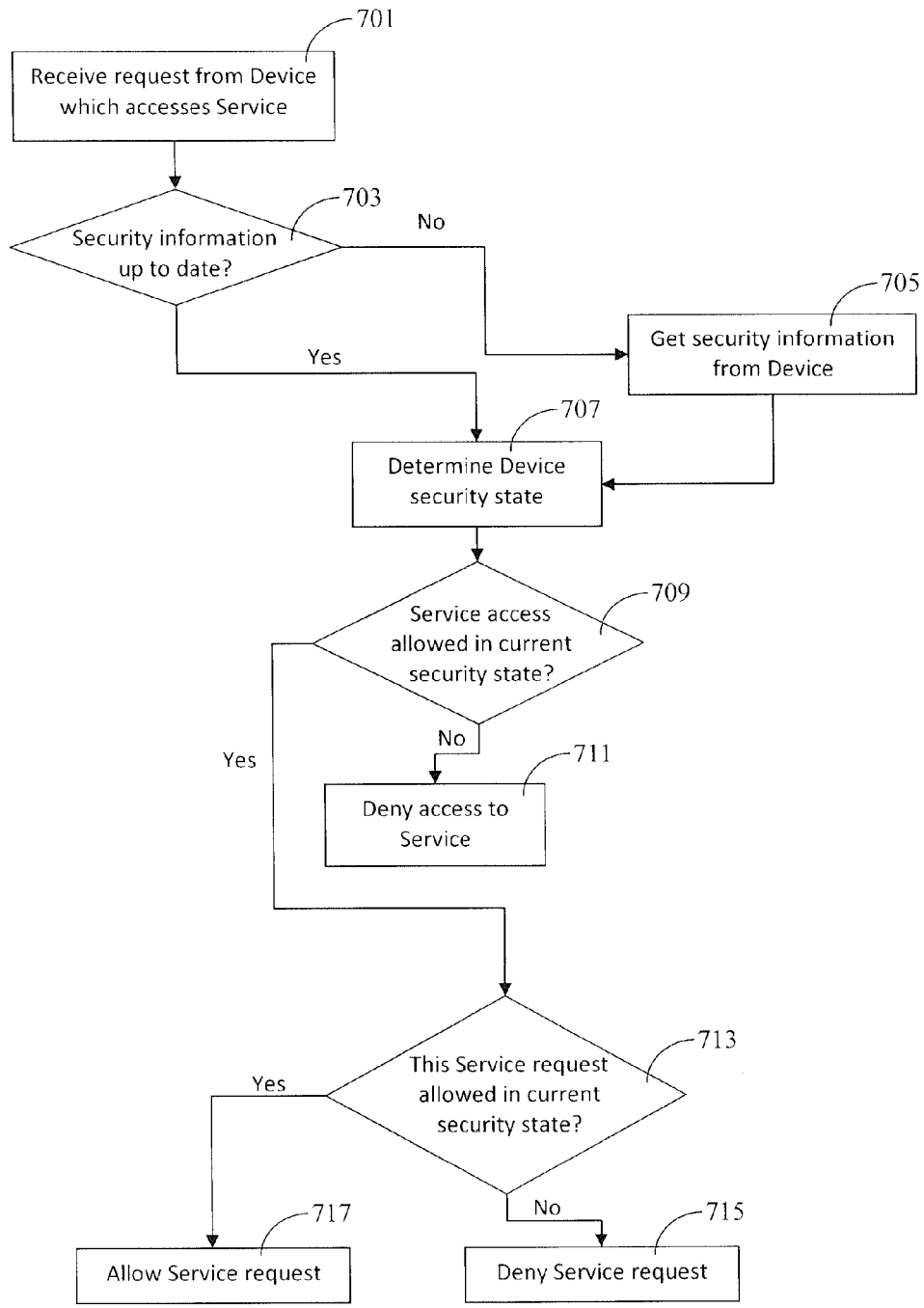
FIG. 7 is an exemplary flow diagram illustrating the steps of an embodiment of the present invention.

For example, in FIG. 7, step 701 illustrates that service provider 150 may receive a request to access its services from device 101. This request may originate directly from device 101, or through server 111. Alternatively, server 111 may receive the request to access service provider 150 from device 101. In step 703, service provider 150 or server 111 checks to see if the security state information for device 101 is up to date. If not, then in step 705, this information is obtained from device 101. Once obtained, server 111 may determine the security state for device 101 (step 707). If device 101's state is unacceptable, then access to service provider 150 will be denied (step 711). In such a case, if server 111 has determined that device 101's state is unacceptable, service provider 150 may never receive device 101's request for access. However, if device 101's state is acceptable, then there may be an additional check to ensure that the state is acceptable for the specific service request or task requested by device 101 (step 713). If device 101's state is acceptable for the requested task, then in step 717, access is granted. If device 101's state is unacceptable, then in step 715, then access is denied. As such, in FIG. 7, device 101 may gain access to service provider 150, but may be denied from performing certain tasks (step 715). In the previous examples, this may be an instance where device 101 has access to checking an account balance (step 717), but transferring funds may be denied (step 715) because of a recent or present security event that has affected device 101's state.

Similarly, conditional access and communications between service provider 150 and device 101 may be primarily managed by server 111. In this embodiment, server 111 provides device 101's security state information to service provider 150, rather than device 101 providing its security state information to service provider 150, as shown in FIG. 7. This is illustrated in FIGS. 8 and 9.

Figure 8:
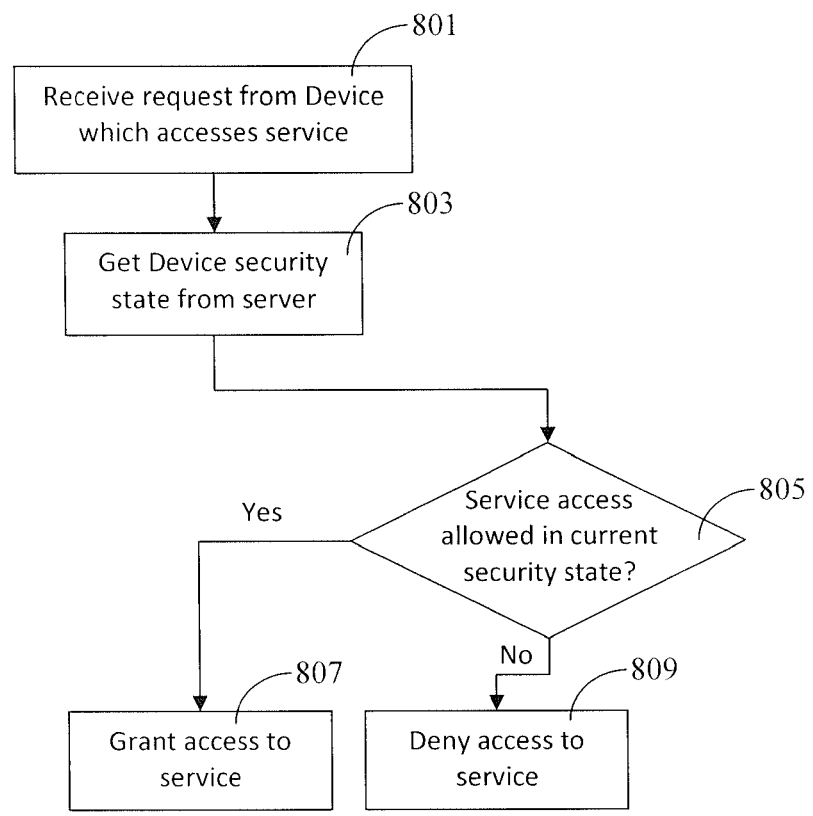
FIG. 8 is an exemplary flow diagram illustrating the steps of an embodiment of the present invention.

In FIG. 8, service provider 150 receives a request for access from device 101 (step 801). However, in step 803, service provider 150 obtains device 101's security state information from server 111, rather than from device 101 (step 705 of FIG. 7). Server 111 or service provider 150 may then determine whether device 101's state is acceptable for further access to service provider 150. If device 101's state is acceptable, then access is granted (step 807). If not, then device 101's access to service provider 150 is denied.

Figure 9:
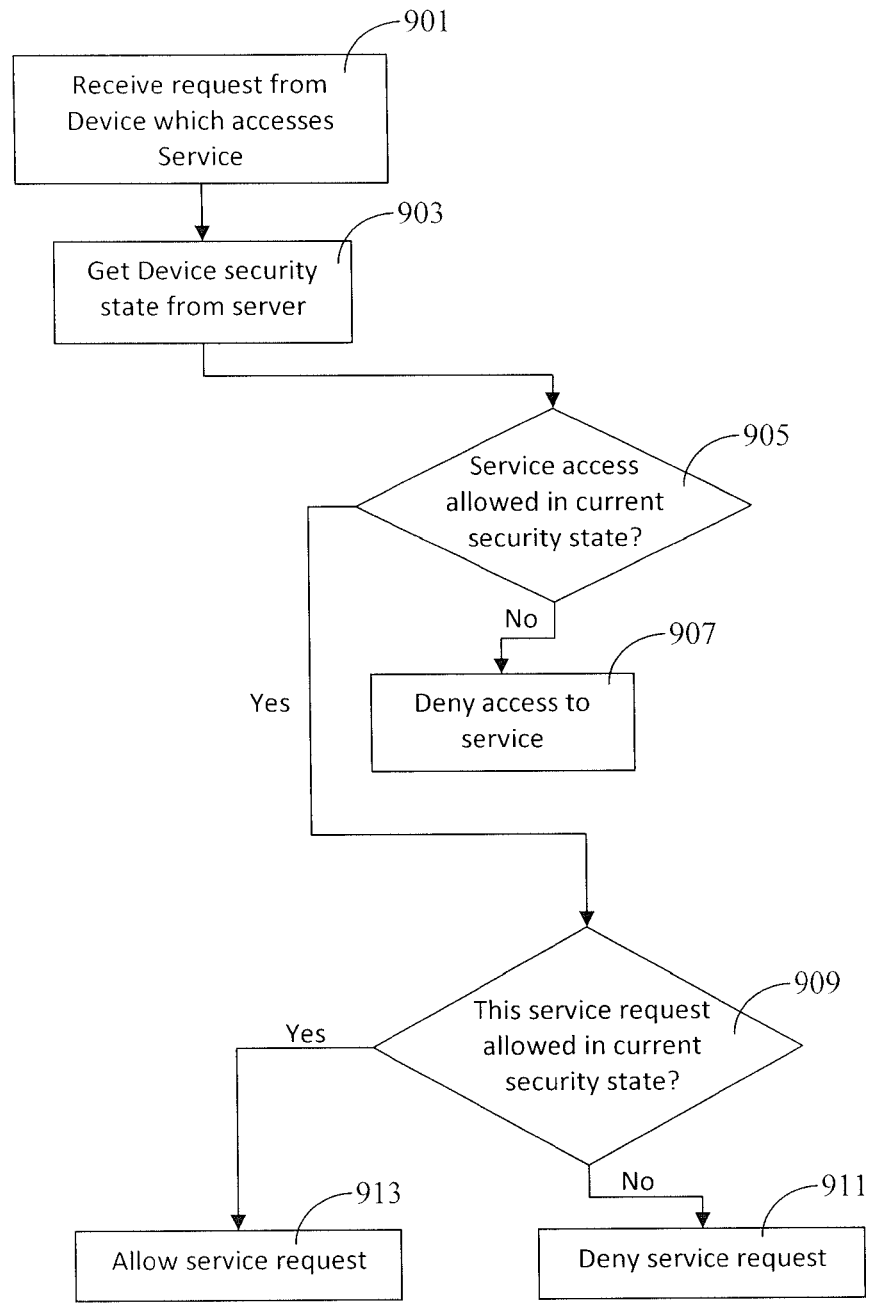
FIG. 9 is an exemplary flow diagram illustrating the steps of an embodiment of the present invention.

FIG. 9 illustrates steps similar to FIG. 8. In step 901, service provider 150 receives a request for access from device 101. Service provider 150 then obtains the security state information for device 101 from server 111 (step 903). If service provider 150 (or server 111) determines that device 101 is not in an acceptably secure state, then further access is denied (step 907). If, however, device 101 is acceptably secure, then there may be an additional assessment to determine whether device 101's state is acceptably secure for the particular service request (step 909). If so, then access to service provider 150 for that particular request is granted (step 913). If not, then access to service provider 150 for that particular request is denied.

Figure 10:
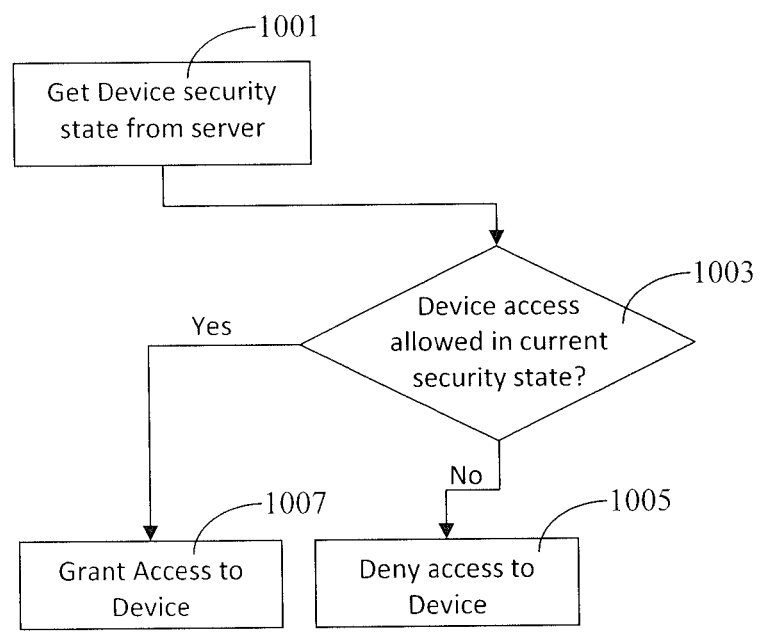
FIG. 10 is an exemplary flow diagram illustrating the steps of an embodiment of the present invention.

FIG. 10 illustrates steps for conditionally accessing device 101 by service provider 150 depending on the state of device 101 as provided by server 111. This embodiment may occur after service provider 150 has established a trusted relationship with server 111, which in turn has established trusted relationships with device 101. Service provider 150 may interact with server 111 to check device 101's state before accessing device 101. In step 1001, service provider 150 requests device 101's security state from server 111. Service provider 150 (or server 111) determines whether device 101 is acceptably secure. If not, then service provider 150 will not access device 101 (step 1005). If device 101 is acceptably secure, then service provider 150 may access device 101 (step 1007).

One will appreciate that any of steps of the methods described above and depicted in the accompanying drawings may be performed in a different order or combined. For example, in FIGS. 7, 8 and 9, the steps of determining whether device 101 is acceptably secure for a specific task or request for access may be combined with the steps for determining whether device 101 is acceptably secure enough to access service provider 150. Other variations are possible without departing from this disclosure or the scope of the present invention.

C. Counteracting Cyber-Terrorism

One will appreciate that the present invention is directed to creating and implementing a secure mobile platform system that provides limited to complete access to one or more mobile communications devices depending upon the security state of the one or more devices. While this may be practical and important in most daily business transactions, it is especially important in the context of national security. While mobile devices may not usually be used for accessing sensitive or potentially classified information, at present, there is little to stop someone from attempting such access, especially since many mobile devices today are Internet, intranet and enterprise-enabled. As such, terrorist organizations have many available points of entry into supposedly secure systems simply by hijacking the mobile devices connected to those systems. Similarly, terrorist organizations can use non-secure systems to capture and control connected mobile communications devices. The present invention provides a secure defense against such attacks by continuously and dynamically monitoring the security state of all connected mobile devices. If an attack is underway, the system will be aware of such attacks and may possess the means to contain and classify the attack. Similarly, the mobile platform system will be aware if a mobile device is removed from contact, since the system will no longer be receiving updates on the device's security state. Because the present invention provides a gateway system for evaluating the security state of a device before granting access to or from the device, device providers as well as service providers can rest assured that they are protected against cyberattacks on their systems.

The descriptions above illustrate how the present invention provides a secure platform for mobile communications devices, whereby the security state of the device affects the level and types of services accessible by the device. Similarly, the security state of the device determines the level and types of services that may access the device. One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A system comprising:
a server for assessing the security state of a mobile communications device, the server having a server security component in communication with the mobile communications device, the server security component further accessing a database available to store security data generated by the mobile communications device;
the server security component receiving from the mobile communications device security data generated by at least one application running on the mobile communications device, and causing the received mobile communications device security data to be stored in the database accessible to the server security component;
the server security component processing the received mobile communications device security data to assess a current security state of the mobile communications device; and
in response to a request from the mobile communications device for access to a service provider or to a request from a service provider to access the mobile communications device, the server security component providing current security state assessment data to the mobile communication device for enforcement of an application-level security policy on the mobile device that determines whether to grant access to a service provider and at what level depending on the current security state assessment of the mobile communications device.

2. The system of claim 1, wherein the server security component communicates with the database containing received mobile communications device security data and the server security component compares the received mobile communications data to other data stored in the database to assess the security state of the mobile communications device.

3. The system of claim 1, wherein the server security component receives a request to access the service provider from the mobile communications device.

4. The system of claim 1, wherein the server security component assesses received security events on the mobile communications device to determine severity levels for the security events, and uses this data as part of the current security state assessment.

5. A system comprising:
a server having a security component for communicating with a mobile communications device and with a service provider, the server security component further accessing a database available to store security data about the mobile communications device;
the server security component receiving from the mobile communications device security data generated by the mobile communications device and causing the received mobile communications device security data to be stored in the database accessible to the server security component;
the server security component processing the received mobile communications device security data to assess a current security state of the mobile communications device; and
in response to a request from the mobile communications device for access to the service provider, the server security component providing current security state assessment data to the requested mobile communications device for enforcement of an application-level security policy on the mobile communication device that determines whether access to the service provider is to be granted to the mobile communication device and at what level.

6. A system comprising:
a server having a security component for communicating with a mobile communications device and with a service provider, the server security component further accessing a database available to store security data generated by the mobile communications device;
the server security component receiving from the mobile communications device security data generated by the mobile communications device and causing the received mobile communications device security data to be stored in the database accessible to the server security component;
the server security component processing the received mobile communications device security data to assess a current security state of the mobile communications device; and
in response to a request from a service provider for access to the mobile communications device, the server security component providing current security state assessment data to the requested mobile communications device for enforcement of an application-level security policy on the mobile communications device that determines whether access to the mobile communications device is to be granted to the mobile communications device and at what level.

7. A non-transitory computer-readable storage medium having stored thereon a plurality of instructions which, when executed by a processor, cause the processor to perform the steps of a method comprising:
at a server security component in communication with a mobile communications device, receiving security event data generated by at least one application running on the mobile communications device;
at the server security component, processing the received event security data to determine severity levels for the security events and using this determination to assess a current security state of the mobile communications device;
at the service security component, receiving a request from the mobile communications device to access a service provider; and,
in response to request for access, at the server security component, determining whether to grant the requested access to the service provider and at what level depending upon the current security state assessment for the mobile communications device.

8. A non-transitory computer-readable storage medium having stored thereon a plurality of instructions which, when executed by a processor, cause the processor to perform the steps of a method comprising:
on a mobile communications device, receiving a request for access to the mobile communications device from a service provider;
at the mobile communications device, assessing by a mobile communication device security component a current security state of the mobile communications device based upon processing of security event data generated by the mobile communications device to determine severity levels for the security events and using this determination as part of assessing the current security state of the mobile communication device; and
at the mobile communication device security component, granting the requesting service provider access to the mobile communications device at an access level determined by the mobile communications device security component depending upon the current security state assessment of the mobile communications device.

9. The non-transitory computer readable storage medium containing computer readable instructions of claim 8 wherein the assessing a current security state of the mobile communications device includes, at the device security component, processing the security data to assess a severity of any security events on the mobile communications device to determine severity levels for the security events.

10. A non-transitory computer-readable storage medium having stored thereon a plurality of instructions which, when executed by a processor, cause the processor to perform the steps of a method comprising:
providing a server security component in communication with a mobile communications device and with a service provider;
at the server security component, receiving a request for access to the service provider from the mobile communications device;
at the server security component, in response to the request for access, assessing the current security state of the mobile communications device by
(i) processing security data generated by at least one application running on the mobile communications device;
(ii) at the server security component, providing access to a database containing mobile communications device security event information; and
at the server security component, comparing the security data generated by at least one application running on the mobile communications device received by the server security component and stored in the database against mobile communications device security event data stored in the database to assess a current security state of the mobile communications device and
(iii) at the server security component, processing the mobile communications device data received by the server security component to assess a severity of security events on the mobile communications device to determine severity levels for the security events, and using this data as part of the current security state assessment
determining whether to grant access to the service provider and at what level depending upon the current security state assessment of the mobile communications device.

11. A non-transitory computer-readable storage medium having stored thereon a plurality of instructions which, when executed by a processor, cause the processor to perform the steps of a method comprising:
providing a server security component in communication with a mobile communications device and a service provider;
at the server security component, receiving a request from the service provider for the current security state assessment of the mobile communications device;
at the server security component, assessing the current security state of the mobile communications device by
(i) processing security data generated by the mobile communications device; and
(ii) at the server security component, providing access to a database containing mobile communications device security event information; and
at the server security component, comparing the security data generated by at least one application running on the mobile communications device received by the server security component and stored in the database against mobile communications device security event data stored in the database to assess a current security state of the mobile communications device and
(iii) at the server security component, processing the mobile communications device data received by the server security component to assess a severity of security events on the mobile communications device to determine severity levels for the security events, and using this data as part of the current security state assessment
providing the security state assessment of the mobile communications device to the service provider.

12. The non-transitory computer-readable storage medium of claim 11 wherein the request for the mobile communications device's security state is received by a web API.

13. A non-transitory computer-readable storage medium having stored thereon a plurality of instructions which, when executed by a processor, cause the processor to perform the steps of a method comprising:
at a server in communication with a mobile communication device and with a service provider, receiving a request from the mobile communications device for access to the service provider;
in response to the request for access to the service provider, requesting by a server security component current security state assessment data concerning the mobile communications device requesting access to the service provider;
if the server security component determines that the mobile communications device security state assessment data is not current, assessing the current security state of the mobile communications device by the server security component obtaining from the mobile communications device event security data generated by the mobile communications device to determine severity levels for the security events and using this determination as part of assessing the current security state of the mobile communication device; and,
at the server security component, granting access to the requested service provider by the mobile communications device at an access level depending upon the current security state assessment of the mobile communications device.

14. A non-transitory computer-readable storage medium having stored thereon a plurality of instructions which, when executed by a processor, cause the processor to perform the steps of a method comprising:
at a server security component in communication with a mobile communications device, receiving security event data generated by at least one application running on the mobile communications device;
at the server security component, processing the received event security data to determine severity levels for the security events and using this determination to assess a current security state of the mobile communications device;
at the service security component, receiving a request from the mobile communications device to access a service provider; and,
in response to request for access, at the server security component, determining whether to grant the requested access to the service provider and at what level depending upon the current security state assessment for the mobile communications device.

15. A non-transitory computer-readable storage medium having stored thereon a plurality of instructions which, when executed by a processor, cause the processor to perform the steps of a method comprising:

at a server security component in communication with a mobile communications device, receiving security event data generated by at least one application running on the mobile communications device;

at the server security component, processing the received security event data to determine severity levels for the security events and using this determination to assess a current security state of the mobile communications device;

at the server security component, receiving a request from a service provider to access the mobile communications device; and, in response to request for access, at the server security component, determining whether to grant the requested access to the mobile communications device and at what level depending upon the current security state assessment for the mobile communications device.

16. A non-transitory computer-readable storage medium having stored thereon a plurality of instructions which, when executed by a processor, cause the processor to perform the steps of a method comprising:

at a server security component in communication with a mobile communications device, receiving security event data generated by at least one application running on the mobile communications device;

at the server security component, processing the received security data to determine severity levels for the security events and using this determination to assess a current security state of the mobile communications device;

at the service security component, receiving a request from the mobile communications device to access a service provider; and, in response to request for access, at the server security component, determining whether to grant the requested access to the service provider and at what level depending upon the current security state assessment for the mobile communications device.

17. A non-transitory computer-readable storage medium having stored thereon a plurality of instructions which, when executed by a processor, cause the processor to perform the steps of a method comprising:

at a server security component in communication with a mobile communications device, receiving security event data generated by at least one application running on the mobile communications device;

at the server security component, processing the received security event data to determine severity levels for the security events and using this determination to assess a current security state of the mobile communications device;

at the server security component, receiving a request from a service provider to access the mobile communications device; and, in response to request for access, at the server security component, determining whether to grant the requested access to the mobile communications device and at what level depending upon the current security state assessment for the mobile communications device.

* * * * *